(12) United States Patent
Copley

(10) Patent No.: US 6,466,792 B1
(45) Date of Patent: Oct. 15, 2002

(54) SYSTEM AND METHOD FOR EFFECTUATING SELECTIVE TRIGGERLESS LOCAL NUMBER PORTABILITY IN A TELECOMMUNICATIONS NETWORK

(75) Inventor: Jeffrey D. Copley, Garland, TX (US)

(73) Assignee: Alcatel, Paris (FR)

( * ) Notice: Subject to any disclaimer, the term of this patent is extended or adjusted under 35 U.S.C. 154(b) by 116 days.

(21) Appl. No.: 09/694,555

(22) Filed: Oct. 23, 2000

(51) Int. Cl.$^7$ ................................................ H04Q 7/20
(52) U.S. Cl. .................. 455/445; 455/432; 455/560; 455/461; 379/221.13; 379/207.02; 379/221.08; 379/221.09; 379/221.1; 379/229
(58) Field of Search ................................ 455/445, 432, 455/560, 461; 379/221.13, 207.02, 221.08, 221.09, 221.1, 229

(56) References Cited

U.S. PATENT DOCUMENTS

| | | | |
|---|---|---|---|
| 6,018,737 A | 1/2000 | Shah et al. | 707/10 |
| 6,075,854 A | 6/2000 | Copley et al. | 379/211 |
| 6,259,783 B1 * | 7/2001 | Tewani et al. | 379/220 |
| 6,356,756 B1 * | 3/2002 | Koster | 455/445 |
| 6,356,757 B1 * | 3/2002 | Sawyer et al. | 455/445 |

* cited by examiner

Primary Examiner—William Trost
Assistant Examiner—Danh C Le

(74) Attorney, Agent, or Firm—Danamraj & Youst, P.C.; V. Lawrence Sewell; Craig A. Hoersten

(57) ABSTRACT

A system and method for effectuating selective triggerless local number portability (TLNP) processing in a telecommunications network having a cellular network portion and a wireline network portion. When an IAM message is received at a signaling node from an MSC on a TLNP-enabled link set, a determination is made at an STP associated therewith whether the NPA-NXX of the received dialed number is marked as portable. If not, the TLNP processing is discontinued and the message as originally received is forwarded to the wireline network portion for further processing. Otherwise, another determination is made if the dialed number is a ported number. If it is determined that the dialed number is not a ported number, the IAM message is marked as dipped and forwarded to the wireline network portion based on the Destination Point Code (DPC) associated with the message. On the other hand, if the dialed number is a ported number, a further determination is made if the DPC of the message corresponds to a match in a DPC/LRN database table. If the DPC is not in the DPC/LRN database table, the TLNP processing is applied to the message before it is forwarded to the wireline portion based on the DPC identified in the message. If the DPC is in the DPC/LRN database table, it is yet further determined whether the LRN received from the database query corresponds to a match in the DPC/LRN database table. If the LRN is not in the DPC/LRN database table, the message is forwarded, again as originally received, to the wireline network portion. Otherwise, the TLNP processing is applied to the message before it is forwarded to the wireline portion.

13 Claims, 2 Drawing Sheets

SYSTEM AND METHOD FOR EFFECTUATING SELECTIVE TRIGGERLESS LOCAL NUMBER PORTABILITY IN A TELECOMMUNICATIONS NETWORK

BACKGROUND OF THE INVENTION

1. Technical Field of the Invention

The present invention is related in general to the field of telecommunications. More particularly, the present invention is related to a system and method for effectuating selective triggerless local number portability in a telecommunications network having a cellular network portion and a wireline network portion.

2. Description of Related Art

Local number portability (LNP) is typically regarded as the capability of a telephony subscriber to change a service provider without a change in the subscriber's directory number. LNP is currently possible in most wireline and cellular telephony networks.

Number portability significantly impacts call routing in the existing telecommunications network. This is so because calls between telephone subscribers in the United States are established on the basis of a national directory number plan, wherein each subscriber line is identified by a ten-digit directory number having both geographic and central/end office (CO/EO) switch significance. The ten-digit directory number comprises a three-digit area code (generally denoted by the letters "NPA") defining a specific geographic region, which is followed by a three-digit office code (denoted by the letters "NXX") identifying a particular switch in the network. The office code is followed by a four-digit subscriber line identifier (denoted by the letters "XXXX") establishing the line address of a particular subscriber line served by the switch that is identified by the NXX digits of the directory number. Subscribers who change service providers, for example, while retaining their directory number are served by a switch which normally serves NPA-NXX digits different from the NPA-NXX digits of the subscriber's directory number. In other words, such subscribers are deemed to have "ported" their directory numbers.

Various techniques exist for facilitating the proper call treatment by the network with respect to such ported directory numbers. Techniques also exist that provide for call treatment with respect to calls that are originated in the cellular network but terminate in the wireline network, and involve ported directory numbers. In such scenarios embracing both wireless and wireline networks, a Mobile Switching Center (MSC) is provided with the capability to route the calls to wireline elements such as an Access Tandem (AT), an EO switch, or both, based on Destination Point Codes (DPCs) associated with the calls. The wireline network elements query an LNP database (i.e., "call dipping") to determine proper call treatment for the ported directory numbers. In essence, a Location Routing Number (LRN) is determined from the database which resembles a traditional ten-digit directory number, wherein the first six digits of the LRN identify a single EO switch in the network. Unlike conventional directory numbers, however, the remaining four digits do not identify a subscriber line address but, instead, indicate that a signaling message parameter should be accessed to obtain the address.

The wireless network may also engage in what is known as a "triggerless" LNP (TLNP) processing wherein LNP database queries are not initiated by the MSC. Instead of dipping the call, the MSC sends normal signaling messages to the wireline network via a Signaling Transfer Point (STP) that has the TLNP capability. When invoked, the TLNP capability inspects messages sent from the MSC to the wireline network. Specifically, the STP intercepts Signaling System No. 7 (SS7) messages (Initial Address Messages or IAM), and uses information obtained from the message to perform an LNP query. Upon query response, the TLNP capability modifies the IAM with the appropriate LNP information and sends the message to its destination. When the wireline network receives the message, it processes it according to normal LNP procedures for a message that has been LNP-dipped.

As is well known, many MSCs have more than one trunk group for routing calls associated with a particular NPA-NXX. For example, an MSC may route a call to the AT disposed in the wireline network portion over what is known as a Type 2A connection. Further, the MSC may route a call to the EO switch via a Type 2B connection. In either routing methodology, TLNP processing at the STP may be provided with respect to directory numbers in LNP environment.

Certain problems arise when an LNP-dipped call for a ported number is forwarded to an EO switch when the ported number is served by a different switch. Since the receiving EO switch typically cannot forward LNP-dipped calls when an LRN is present indicating a ported number, the calls get dropped. Additionally, this problem is particularly compounded when the MSC is in some service agreement to route as much of call traffic as possible to a particular EO switch over a Type 2B connection.

Based on the foregoing, it should be appreciated that there has arisen a need for a modified TLNP process wherein an MSC can route dipped calls to the AT node using normal TLNP procedures, while selectively engaging in the TLNP processing only for calls routed to the EO (via Type 2B connections) with respect to directory numbers that are identified as ported into that EO.

SUMMARY OF THE INVENTION

Accordingly, the present invention provides an innovative system and method for effectuating selective triggerless local number portability (TLNP) processing in a telecommunications network having a cellular network portion and a wireline network portion. By practicing the teachings of the present invention, communication traffic from a Mobile Switching Center (MSC) disposed in the cellular network portion can be selectively LNP-processed to minimize the cost of implementing LNP procedures on such traffic.

In one aspect, the present invention is directed to a method for effectuating selective TLNP in a network as set forth above. When an Initial Address Message (IAM message) is received from the MSC on a TLNP-enabled link set, a determination is made at a Signal Transfer Point (STP) associated therewith whether the NPA-NXX of the received dialed number is marked as portable. If not, the TLNP processing is discontinued and the message as originally received is forwarded to the wireline network portion for further processing. Otherwise, another determination is made to see if the dialed number is a ported number. If it is determined that the dialed number is not a ported number, the IAM message is marked as dipped and forwarded to the wireline network portion based on the Destination Point Code (DPC) associated with the message. On the other hand, if the dialed number is a ported number, a further determination is made if the DPC of the message corresponds to a match in a DPC/LRN database table. If the DPC is not in the DPC/LRN database table, the TLNP processing is applied to the message before it is forwarded to the wireline portion based on the DPC of the message. If the DPC is in the DPC/LRN database table, it is yet further determined whether the LRN received from the database query corresponds to a match in the DPC/LRN database table. If the LRN is not in the DPC/LRN database table, the message is forwarded, again as originally received, to the wireline network portion. Otherwise, the TLNP processing is applied to the message before it is forwarded to the wireline portion based on the DPC.

In another aspect, the present invention is directed to a system for effectuating selective TLNP in a telecommunications network having a cellular network portion and a wireline network portion. The cellular network portion includes an STP that is operable to receive a plurality of IAMs (which include the dialed numbers of called parties disposed in the wireline network portion) from an MSC on a TLNP-enabled link set to which it is coupled. The MSC includes a structure for forwarding the IAM messages to the STP which preferably includes a TLNP database. The database is populated with a NPA-NXX table for identifying portable NPA-NXX numbers and DPC/LRN decision tables. The wireline portion includes a plurality of EO switches within a number portability area and one or more Access Tandem (AT) nodes. Trunks from the MSC to the wireline network portion comprise Type 2A connections to the AT nodes as well as Type 2B connections to select EO switches with which the MSC operator has service agreements to forward call traffic. A logic structure is operably associated with the STP for determining whether the communication traffic received at the STP over a select TLNP-enabled link of the cellular network portion is to be selectively processed for TLNP procedures, wherein a portion of the traffic is directed to a select EO switch (e.g., EO-1) over a Type 2B connection. The determination is based on queries to both NPA-NXX tables as well as the DPC/LRN decision tables. For calls that terminate in the EO-1 switch and calls to be ported into that switch, the IAM messages are marked as dipped. On the other hand, for the ported calls for which the LRN does not match the LRN of the EO-1, the IAM messages are routed to the wireline network portion without any dipping flags.

In yet another aspect, the present invention is directed to a computer-accessible medium operably associated with a processing entity located at a signaling node (such as, e.g., an STP with an LNP database) that is disposed in a telecommunications network. The computer-accessible medium carries a set of instructions which, when executed by the processing entity, cause the signaling node to perform the steps of a selectively effectuated TLNP processing method such as the method set forth above, in order to maximize call traffic forwarded on Type 2B connections while minimizing the cost of implementing TLNP on such traffic.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1:
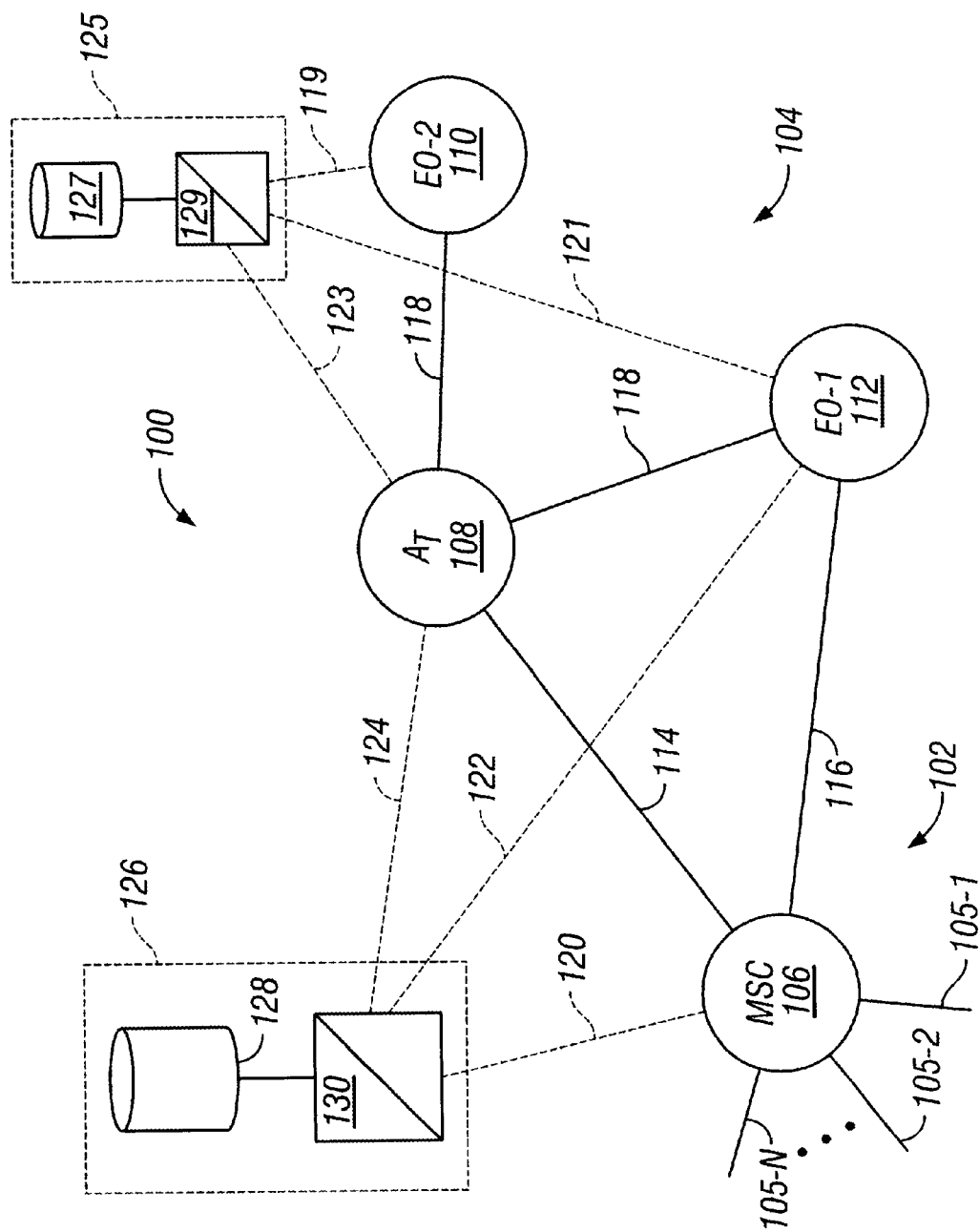
FIG. 1 depicts an exemplary embodiment of a telecommunications network provided in accordance with the teachings of the present invention.

In the drawings, like or similar elements are designated with identical reference numerals throughout the several views thereof, and the various elements depicted are not necessarily drawn to scale. Referring now to FIG. 1, depicted therein is a presently preferred exemplary embodiment of a telecommunications network 100 provided in accordance with the teachings of the present invention. The telecommunications network 100 is preferably comprised of a cellular telephony network portion 102 and a wireline telephony network portion 104. Although not explicitly shown, the cellular network portion 102 is formed of various conventional wireless network elements interconnected with a plurality of signaling links (e.g., Signaling System No. 7 (SS7) links), wherein a Mobile Switching Center (MSC) 106 is provided as an exemplary node having link sets 105-1 through 105-N. In a similar fashion, the wireline telephony network portion 104 is formed of known network elements configured into a switched circuit network or SCN (e.g., the Public Switched Telephone Network or PSTN). A plurality of End Office (EO) switches (for example, EO-1 112 and EO-2 110) and an Access Tandem (AT) (AT 108) are illustrative of the various nodes within the PSTN. In an exemplary configuration, EO-1 112 and EO-2 110 may be provided as exchanges operable within one or more Local Exchange Carrier (LEC) networks which may be operated by the same or different service providers. Further, these exchanges may belong to a Local Number Portability (LNP) group for effectuating conventional LNP processing with respect to ported telephone numbers (and/or subscribers) within their coverage areas.

Continuing to refer to FIG. 1, MSC 106 is coupled to AT 108 via a Type 2A trunk connection 114. Further, a Type 2B trunk connection 116 is operably disposed between MSC 106 and EO-1 112. In the exemplary embodiment, the operator of MSC 106 and the operator EO-1 112 have a service agreement (e.g., a bulk traffic service arrangement) for routing as much traffic as possible over the Type 2B trunk connection 116, which traffic emanates from the cellular network portion 102 and is destined to terminate in the wireline network portion 104. Accordingly, there exist considerable financial incentives for the MSC 106 to route its wireline-terminating traffic over the Type 2B trunk connection 116, rather than routing through AT 108 over the Type 2A trunk connection 114, whether such traffic is intended for other EO switches or not.

A service/signaling node 126 is provided in the telecommunications network 100 for effectuating triggerless LNP processing with respect to calls routed through MSC 106 (such calls being received over specific links sets that have been enabled for TLNP processing) and terminating in the wireline network portion 104. In a presently preferred exemplary embodiment of the present invention, node 126 comprises a Signaling Transfer Point (STP) 130 having an LNP database 128 associated therewith, although it should be recognized by those skilled in the art that various configurations are available. For example, the LNP database 128 may be provided as part of a separate network element e.g., a Service Control Point (SCP) that can be queried by the STP or as part of the STP. Also, node 126 is provided with a processing entity (not shown) and an appropriate computer-accessible medium (or media) operably associated therewith for effectuating various call control/routing functionalities.

Reference numerals 120, 122, and 124 refer to control paths disposed between the node 126 and the various cellular and wireline network elements. Further, reference numerals 119, 121, and 123 refer to control paths disposed between various wireline network elements and a wireline service node 125 (having an STP 129 and database 127 associated therewith) for implementing conventional LNP in wireline environments. Control paths 119, 121, and 123 are typically employed for effectuating such conventional LNP processing wherein nodes such as EO-1 112, AT 108, and EO-2 110 query the node 125 based upon an LNP-related trigger encountered during call processing (i.e., dipping). On the other hand, MSC 106 sends SS7 messages to the node 126 via control path 120 for effectuating a triggerless LNP process.

The LNP database 128 comprises Location Routing Numbers (LRNs) associated with NPA-NXX portions that are marked for porting. Accordingly, LRNs are provided in association with ported dialed numbers. Further, the LNP database 128 is populated with a Destination Point Code (DPC) table (hereinafter referred to as the DPC/LRN table) wherein specific DPCs are associated with specific LRNs for selectively effectuating triggerless LNP processing.

Figure 2:
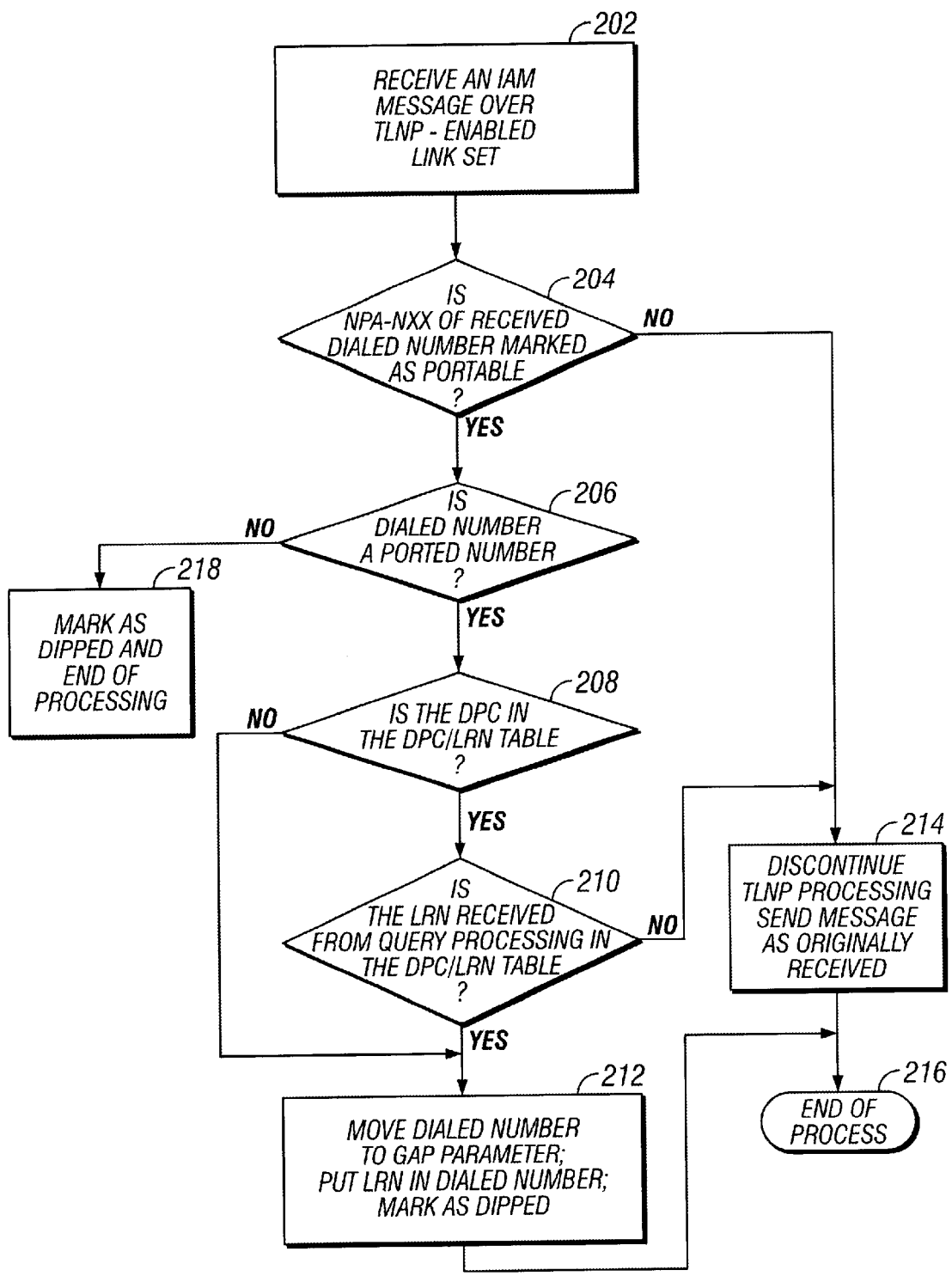
FIG. 2 is a flow chart of the steps for selectively effectuating TLNP processing on traffic forwarded from an MSC to a wireline network portion in accordance with the teachings of the present invention.

Referring now to FIG. 2, depicted therein is a flow chart of the steps of an exemplary method provided in accordance with the teachings of the present invention for selectively effectuating TLNP processing on traffic forwarded from MSC 106 to the wireline network portion 104 shown in FIG. 1. To initiate signaling to the wireline network, the MSC sends an Initial Address Message over TLNP-enabled link set (e.g., reference numeral 120 in FIG. 1) via node 126 to either AT 108 or EO-1 112. Upon receiving the IAM (step 202), a determination is made at node 126 to determine whether the NPA-NXX of the called party's number dialed (which is provided as part of the received IAM message) is marked as portable in the database (decision block 204). If not, further processing is discontinued with respect to that call and the signaling message is forwarded by the STP node 126 to the wireline network portion as originally received (step 214). The DPC provided in the signaling message is used for forwarding the message. The processing ends subsequently (step 216).

If it is determined that the NPA-NXX of the number dialed is marked as portable, a further determination is made to determine whether the dialed number is a ported number (decision block 206). If the dialed number is not a ported number, the signaling message is marked as dipped (by setting a Forward Carrier Indicator (FCI) bit in the message) and further TLNP processing is discontinued (step 218). Thereafter, the signaling message is sent to the wireline network based on the DPC provided in the message.

If the dialed number is a ported number, another determination follows wherein it is determined whether the DPC of the signaling message matches a DPC of the DPC/LRN table of the LNP database (decision block 208). If the DPC is not found in the DPC/LRN table, a TLNP procedure (step 212) involving multiple actions takes place (in no particular order) as follows:

The dialed number is moved to a specific parametric location in the signaling message. In a presently preferred exemplary embodiment of the present invention, the dialed number is moved to the GAP parameter of the IAM message;

The LRN is put in the dialed number parameter of the signaling message; and

The signaling message is marked as dipped by setting the FCI bit appropriately.

The signaling message is then forwarded to the wireline network portion based on the DPC of the message. The TLNP processing thereafter terminates (step 216).

If the DPC is found in the DPC/LRN table, yet another determination is made to determine if the LRN obtained upon query processing is also found in the DPC/LRN table (decision block 210). If so, the TLNP procedure (step 212) as set forth above is effectuated. Here, the DPC/LRN match in the data table signifies a Type 2B connection. Accordingly, the message is sent to an appropriate destination in the wireline network portion based on the DPC. The process ends subsequently (step 216). If the LRN received from the query processing is not in the DPC/LRN table, the TLNP procedure is bypassed and the message is sent by the MSC to the wireline network as originally received (step 214) in accordance with the DPC.

Based on the foregoing, it should be appreciated that the present invention advantageously provides an innovative solution for selectively effectuating TLNP processing over Type 2B connections in order to maximize revenue by sending as much traffic as possible over such connections. Selective processing is implemented by employing the DPC/LRN table provided in accordance with the teachings of the present invention, which advantageously identifies situations where a triggerless LNP dip is not to be performed. Since the EO cannot forward LNP-dipped calls when an LRN is present (indicating a ported number), such undesirable situations are avoided accordingly.

It should be further appreciated that the present invention allows the enabling of TLNP capabilities as currently available in conjunction with the selective enabling of such capabilities only with respect to specific LRNs having Type 2B connections. In this manner, normal TLNP processing of calls provide for routing over Type 2A connections while also having selective processing of calls for routing over Type 2B connections.

It is believed that the operation and construction of the present invention will be apparent from the foregoing Detailed Description. While the apparatus and method shown and described have been characterized as being preferred, it should be readily understood that various changes, modifications and enhancements could be made therein without departing from the scope of the present invention as set forth in the following claims.

What is claimed is:

1. A method for effectuating selective triggerless local number portability (TLNP) in a telecommunications network having a cellular network portion and a wireline network portion, comprising the steps of:

receiving a signaling message in a signaling node from a Mobile Switching Center (MSC) disposed in said cellular network portion, said signaling message being effectuated on a select link set coupled to said signaling node and including a dialed number, wherein said select link set is identified as enabled for a triggerless local number portability (TLNP) process;

determining in said signaling node if a predetermined portion of said dialed number is marked as portable;

if said predetermined portion of said dialed number is not marked as portable, forwarding said signaling message as originally received by said signaling node to said wireline network portion;

otherwise, determining if said dialed number comprises a ported number;

if said dialed number is not a ported number, marking said signaling message to indicate that said signaling message is a dipped signaling message and forwarding said dipped signaling message to said wireline network portion;

otherwise, determining if a Destination Point Code (DPC) associated with said signaling message is located in a database table coupled to said signaling node;

if not, performing the following steps in said signaling node:
  (i) moving said dialed number to a select parameter location of said signaling message;
  (ii) determining a Location Routing Number (LRN) for said dialed number;
  (iii) substituting said LRN for said dialed number in said signaling message;
  (iv) marking said signaling message to indicate that said signaling message is a dipped signaling message; and
  (v) forwarding said dipped signaling message to a destination disposed in said wireline network portion as indicated by said DPC; and otherwise, if said DPC is located in said database table coupled to said signaling node, performing the following steps in said signaling node:
  (i) determining an LRN for said dialed number;
  (ii) determining if said LRN matches a select LRN associated with said DPC; and
  (iii) if so, moving said dialed number to said select parameter location of said signaling message, substituting said LRN for said dialed number in said signaling message, marking said signaling message to indicate that said signaling message is a dipped signaling message, and forwarding said dipped signaling message based on said LRN to a destination identified by said DPC disposed in said wireline network portion.

2. The method for effectuating selective TLNP in a telecommunications network as set forth in claim 1, wherein said signaling node comprises a Signal Transfer Point (STP) having a DPC/LRN database associated therewith.

3. The method for effectuating selective TLNP in a telecommunications network as set forth in claim 2, wherein said signaling message comprises an Initial Address Message (IAM).

4. The method for effectuating selective TLNP in a telecommunications network as set forth in claim 3, wherein said predetermined portion of said dialed number comprises an NPA-NXX portion of said dialed number.

5. The method for effectuating selective TLNP in a telecommunications network as set forth in claim 3, wherein said step of forwarding said dipped signaling message is based on said destination identified by said DPC.

6. The method for effectuating selective TLNP in a telecommunications network as set forth in claim 3, wherein said step of forwarding said dipped signaling message to said wireline network portion is based on said DPC.

7. The method for effectuating selective TLNP in a telecommunications network as set forth in claim 3, wherein said selected parameter to which said dialed number is moved comprises a GAP parameter.

8. A computer-accessible medium operably associated with a processing entity at a Signal Transfer Point (STP) disposed in a telecommunications network having a cellular network portion and a wireline network portion, said computer-accessible medium carrying a set of instructions which, when executed by said processing entity, cause said STP to perform the following steps:
  upon receiving a signaling message from a Mobile Switching Center (MSC) disposed in said cellular network portion, determining if a predetermined portion of a dialed number received in said signaling message is marked as portable;
  if said predetermined portion of said dialed number is not marked as portable, forwarding said signaling message as originally received by said MSC to said wireline network portion;
  otherwise, determining if said dialed number comprises a ported number;
  if said dialed number is not a ported number, marking said signaling message to indicate that said signaling message is a dipped signaling message and forwarding said dipped signaling message to said wireline network portion;
  otherwise, determining if a Destination Point Code (DPC) associated with said signaling message is located in a database associated with said STP;
  if not, performing the following steps in said STP:
    (i) moving said dialed number to a select parameter location of said signaling message;
    (ii) determining a Location Routing Number (LRN) for said dialed number;
    (iii) substituting said LRN for said dialed number in said signaling message;
    (iv) marking said signaling message to indicate that said signaling message is a dipped signaling message; and
    (v) forwarding said dipped signaling message to a destination disposed in said wireline network portion based on said DPC; and otherwise, if said DPC is located in said database, performing the following steps in said signaling node:
  (i) determining an LRN for said dialed number;
  (ii) determining if said LRN matches a select LRN associated with said DPC; and
  (iii) if so, moving said dialed number to said select parameter location of said signaling message, substituting said LRN for said dialed number in said signaling message, marking said signaling message to indicate that said signaling message is a dipped signaling message, and forwarding said dipped signaling message based on said LRN to a destination identified by said DPC disposed in said wireline network portion.

9. The computer-accessible medium operably associated with a processing entity at an STP disposed in a telecommunications network as set forth in claim 8, wherein said signaling message comprises an Initial Address Message (IAM).

10. The computer-accessible medium operably associated with a processing entity at an STP disposed in a telecommunications network as set forth in claim 9, wherein said predetermined portion of said dialed number comprises an NPA-NXX portion of said dialed number.

11. The computer-accessible medium operably associated with a processing entity at an STP disposed in a telecommunications network as set forth in claim 9, wherein said step of forwarding said dipped signaling message is based on said destination identified by said DPC.

12. The computer-accessible medium operably associated with a processing entity at an STP disposed in a telecommunications network as set forth in claim 9, wherein said step of forwarding said dipped signaling message to said wireline network portion is based on said DPC.

13. The computer-accessible medium operably associated with a processing entity at an STP disposed in a telecommunications network as set forth in claim 10, wherein said selected parameter to which said dialed number is moved comprises a GAP parameter.

\* \* \* \* \*